(12) United States Patent
Kassab

(10) Patent No.: US 7,781,674 B2
(45) Date of Patent: Aug. 24, 2010

(54) PROTECTIVE HOUSING FOR WIRES

(76) Inventor: Dorothy Kassab, 3503 Lincoln Knolls East, Canastota, NY (US) 13032

( * ) Notice: Subject to any disclaimer, the term of this patent is extended or adjusted under 35 U.S.C. 154(b) by 0 days.

(21) Appl. No.: 11/945,613

(22) Filed: Nov. 27, 2007

(65) Prior Publication Data
US 2008/0121407 A1 May 29, 2008

Related U.S. Application Data

(60) Provisional application No. 60/867,439, filed on Nov. 28, 2006.

(51) Int. Cl.
*H01B 11/06* (2006.01)
(52) U.S. Cl. .......................................................... 174/36
(58) Field of Classification Search ................... 174/36, 174/110 R; 428/35.1
See application file for complete search history.

(56) References Cited

U.S. PATENT DOCUMENTS

| | | | |
|---|---|---|---|
| 4,296,157 A | | 10/1981 | Conti |
| 4,750,805 A | | 6/1988 | Vaderwall |
| 4,803,103 A | * | 2/1989 | Pithouse et al. ............ 428/34.5 |
| 4,814,546 A | * | 3/1989 | Whitney et al. ............... 174/36 |
| 4,891,256 A | * | 1/1990 | Kite et al. ................... 428/36.1 |
| 4,929,478 A | * | 5/1990 | Conaghan et al. .......... 428/35.1 |
| 5,106,437 A | * | 4/1992 | Lau et al. ....................... 156/51 |
| 5,476,630 A | | 12/1995 | Orsing |
| 5,619,569 A | | 4/1997 | McVay |
| 6,005,191 A | * | 12/1999 | Tzeng et al. ............. 174/102 R |
| 6,051,789 A | | 4/2000 | Kato |
| 6,068,476 A | | 5/2000 | Point |
| 6,329,602 B1 | * | 12/2001 | Ushiyama et al. ........ 174/137 R |
| 6,410,848 B1 | * | 6/2002 | Shrader et al. ................ 174/36 |
| 6,488,053 B1 | | 12/2002 | Tadokoro |
| 6,530,603 B1 | | 3/2003 | Hartman |
| 6,570,093 B2 | | 5/2003 | Doshita et al. |
| 6,573,451 B2 | | 6/2003 | Komiya et al. |
| 6,774,312 B2 | * | 8/2004 | Fatato .................... 174/102 D |
| 7,004,627 B2 | | 2/2006 | Strong |
| 7,070,326 B2 | | 7/2006 | Manley |
| 7,090,395 B2 | | 8/2006 | Glazer |
| 2001/0055368 A1 | | 12/2001 | Carroll |
| 2003/0134254 A1 | | 7/2003 | Filho |
| 2004/0084203 A1 | * | 5/2004 | Gladfelter et al. ............. 174/93 |

(Continued)

FOREIGN PATENT DOCUMENTS

DE           19856605           6/2000

(Continued)

*Primary Examiner*—William H Mayo, III
(74) *Attorney, Agent, or Firm*—George R. McGuire; Frederick J. M. Price; Bond Schoeneck & King, PLLC

(57) ABSTRACT

The present invention relates to a non-corrugated protective tubular housing for electrically and non-electrically conducting elongated members. The non-corrugated protective tubular housing can include a tubular body extending along a longitudinal axis that defines a length between a first end and a second end and defining a hollow volume, where at least one of the first and second ends is an open end; and a slit extending along the longitudinal axis and over at least a portion of the length between the first and second ends. The present invention also relates to a method having the step of housing the electrically conducting elongated member within the non-corrugated protective tubular housing.

24 Claims, 5 Drawing Sheets

U.S. PATENT DOCUMENTS

| | | |
|---|---|---|
| 2004/0145676 A1 | 7/2004 | Lin |
| 2004/0168815 A1 | 9/2004 | Ohstubo et al. |
| 2005/0103148 A1 | 5/2005 | Inoue et al. |
| 2005/0247826 A1 | 11/2005 | Tadokoro |
| 2005/0260884 A1 | 11/2005 | Yueh |
| 2005/0268725 A1 | 12/2005 | Tulkki |

FOREIGN PATENT DOCUMENTS

| | | |
|---|---|---|
| JP | 2002010459 | 1/2002 |
| WO | WO 96/32064 | 10/1996 |

* cited by examiner

PROTECTIVE HOUSING FOR WIRES

This application claims priority to U.S. Provisional Patent Application Ser. No. 60/867,439, filed Nov. 28, 2006, the entirety of which is hereby incorporated by reference.

BACKGROUND OF THE INVENTION

1. Field of Invention

The present invention relates generally to protective housings for electrically and non-electrically conducting elongated members, and, more particularly, to a non-corrugated protective tubular housing for wires (including cables) that substantially prevents deleterious bending, crimping, coiling, kinking, and/or other damaging forces from shortening the effective lifespan of the wire and any attached components.

2. Description of Prior Art

Wires are electrical conductors that are used to carry electricity and other signals including digital, optical, audio, video and telephonic signals. A cable usually includes more than one wire bundled together. Wires, whether they are used, for example, to connect headphones to an audio/video device, speakers to a receiver, cable from a cable box to a T.V., telephonic headset to a telephonic base, or a mouse to a computer, have a tendency to bend, crimp, coil and/or kink, and inconveniently tangle. These wires also may be subjected to other damaging forces such as from wheels on chair legs. These damaging forces result in deleterious effects to the wires such as shorts, and a permanent defect in the wire. Due to the permanent damage to the wire, consumers are forced to purchase replacement wires (and, potentially, any attached components), which is often an expensive proposition.

An illustrative example relates to the use of USB wires to connect digital radiography sensors to a computer in the field of dentistry. Instead of using traditional x-ray photographic film to obtain images of a patient's teeth, more dentists and clinicians are using digital x-ray sensors to capture and store these images. Digital radiography is a process that uses digital x-ray sensors to obtain and convert x-ray images into electronic data that can be viewed and analyzed by a clinician on a computer monitor as well as electronically stored.

Digital radiography requires communication between the digital sensor (in the form of a "plate") that is placed in a patient's mouth, and the digital information storage device (e.g., a computer). This communication can be facilitated either wirelessly or through USB wire that connects the digital sensor to the computer. In a non-wireless configuration, the sensor's wire is housed in electric tubing which fits tightly against the wire. When x-rays hit the sensor's plate inside a patient's mouth, the information is digitized and sent to the computer via the wire. The software programs converts the information to images, which can be read and interpreted by the dentist.

One of the most common problems with the digital x-ray sensors that are not wireless is the damage of the wire due to bending, crimping, coiling, and/or kinking during operation of the digital sensor. Upon such bending, crimping, coiling, and/or kinking, the wire can become shorted. This short essentially results in sensor failure, cutting off any effective transmission of information from the sensor to the computer.

With the current design of the sensor's wire, bending, crimping, coiling, and/or kinking is inevitable. Due to this inevitability, the life span of the wired sensors is very short and unpredictable.

The prior art provides corrugated tubes that are used for bundling and protecting transmission/distribution wires harnesses (see, e.g., U.S. Pat. No. 6,488,053). These corrugated tubes include annular ridges on the outer peripheral face of the tube to impart a bendability or flexibility to the corrugated tube. Corrugated tubes, however, have a tendency to bend, coil, and tangle upon themselves during operational use resulting in deleterious effects to the wires housed within the corrugated tubes (as discussed supra). Corrugated tubes are typically indicated to cover cables which are expected to be substantially stationary. However, these tubes are not usually indicated for covering cables that are under constant movement (changing position and/or location) dictated by operational needs, e.g., manipulation of one end of the cable by a person or machinery (especially for cables expected not to tangle, bind, brake continuity or function of internal components). Also, corrugated tubes are not easily disinfected and are not meant to be used in a medical environment where highly sanitized medical equipment is a high priority; debris easily gets lodged into the corrugations and are difficult to sanitize and disinfect between use on different patients.

Similarly to the electrical conductors discussed above, non-electrical conductors such as a hose, rope, and the like, have a tendency to bend, crimp, coil and/or kink, and inconveniently tangle. These non electrical conductors also may be subjected to other damaging forces such as car and bicycle wheels resulting in permanent damage to the non-electrical conductor. As with permanent damage to wires noted supra, this permanent damage requires consumers to purchase replacement non-electrical conductors (and, potentially, any attached components).

Accordingly, it would be useful and desirable to have a protective device for wires (e.g., digital radiography imaging wires) to prevent them from bending, crimping, coiling, and/or kinking, as well as prevent the wires from being subjected to any other damaging force, thereby extending the effective life of the wire and any attached components (e.g., digital radiography sensor). In addition, it would be useful and desirable for such a device to be quickly and easily attached to and detached from the wire. Also, it would be useful and desirable to have a protective device for wires that can be easily sanitized and disinfected. Moreover, it would be useful and desirable to have a protective device for non electrical conductors with the same qualities.

SUMMARY OF THE INVENTION

In accordance with an embodiment of the present invention, protective housings for electrically and non-electrically conducting elongated members, and, more particularly, non-corrugated protective tubular housing for wires (including cables) that substantially prevents deleterious bending, crimping, coiling, kinking, and/or other damaging forces from shortening the effective lifespan of the wire and any attached components, are provided.

In accordance with an embodiment of the present invention, a non-corrugated protective tubular housing for wires that substantially prevents shorts caused by bending, crimping, coiling and/or kinking, and preventing inconvenient tangling of the wire, is provided. In a preferred embodiment, the non-corrugated protective tubular housing for wires of an embodiment of the present invention is designed for housing and protecting small diameter non-pre-coiled wires/cables, which can be under constant movement dictated by operational needs (e.g., wires changing position and/or location through manipulation of at least one end by human hands or machinery), especially for wires not adapted for such movement.

In accordance with an embodiment of the present invention, a non-corrugated protective tubular housing for wires is provided that maintains the wire in a configuration that substantially prevents any bending, crimping, coiling and/or kinking, e.g., keeps the wire stretched out and substantially linear or in a non-deleteriously wound configuration. The present invention also contemplates the use of the non-corrugated protective tubular housing to surround other "longitudinal" or non-electrically conducting elongated members such as a hose, rope, and the like, and keep these items stretched out and substantially linear or in a non-deleteriously wound configuration.

In accordance with an embodiment of the present invention, a wire in which the non-corrugated protective tubular housing for wires of an embodiment of the present invention is designed to protect includes, but is not limited to, any electrically conducting elongated member where bending, crimping, coiling, kinking, and/or other damaging forces that shortens the effective lifespan of the electrically conducting elongated member is undesirable. For example, the wire can include, but is not limited to, any electrical, optical, audio, video, cable, telephonic, fiber optic, data, power, digital, and USB wire, and the like.

In accordance with an embodiment of the present invention, a non-corrugated protective tubular housing for wires is provided comprising a tubular body extending along a longitudinal axis that defines a length between a first end and a second end and defining a hollow volume, wherein at least one of said first end and said second end is an open end, and a slit which extends along the longitudinal axis of the tubular body and over at least a portion of the length of the tubular body between the first end and the second end. The slit is defined by opposing first and second edges that are biased towards a contacting position. The edges may be sealed with any kind of tape, or other adhesive or sealing mechanism.

In accordance with an alternative embodiment of the present invention, the tubular body can comprise at least one overlapping edge segment extending over at least a portion of the length of the tubular body between the first and the second end. The at least one overlapping edge segment is provided to assist in preventing the housed wire from coming out of the non-corrugated protective tubular housing for wires of an embodiment of the present invention. The at least one overlapping edge segment transversely extends from one of the opposing edges, over or under the slit, and over or under the other opposing edge on the outside or inside of the tubular body, thereby containing the wire therein. The at least one overlapping edge segment may contain an adhesive on its surface to removably seal the overlapping portion to the tubular body.

In accordance with an embodiment of the present invention, the opposing edges allow wires to be quickly and easily placed within, as well as removed from, the non-corrugated protective tubular housing for wires of an embodiment of the present invention, as will be discussed in detail below with reference to the Figures. The wire is placed within the non-corrugated protective tubular housing for wires of an embodiment of the present invention, which, after insertion, keeps the wire in a configuration that substantially prevents the wire from bending, crimping, coiling, and/or kinking, as well as substantially prevents other damaging forces from shortening the effective lifespan of the wire.

In accordance with an embodiment of the present invention, the non-corrugated protective tubular housing for wires of an embodiment of the present invention may be made from a number of different materials and mixtures of materials including, but not limited to, plastic material, rubber, Styrofoam, medical grade silicon, and the like. These materials impart some flexibility to the non-corrugated protective tubular housing for wires of an embodiment of the present invention, while also providing the necessary protection to the wire against the enumerated deleterious effects, as discussed supra. These materials also allow the non-corrugated protective tubular housing for wires to be easily cleaned and disinfected.

In accordance with an embodiment of the present invention, the non-corrugated protective tubular housing for wires of an embodiment of the present invention has a length shorter than that of the wire that it surrounds. A non-corrugated protective tubular housing for wires with an inner diameter larger than the outer diameter of the wire, is also provided. This larger inner diameter of the protective tubular wire housing allows the wire to freely move inside the non-corrugated protective tubular housing for wires, while at the same time keeping the wire in a configuration that substantially prevents the wire from bending, crimping, coiling, and/or kinking and tangling during usage, as well as when it is stored. In a preferred embodiment of the present invention, the non-corrugated protective tubular housing for wires has a length of at least ¾ the length of the wire, and ¼ to ½ inches of space around the wire.

Alternatively, in accordance with an embodiment of the present invention, the non-corrugated protective tubular housing for wires of an embodiment of the present invention has a length that is the substantially the same length as or longer than that of the wire that the non-corrugated protective tubular housing for wires is surrounding. Moreover, a non-corrugated protective tubular housing for wires with an inner diameter that is substantially the same size as the outer diameter of the wire, is also provided.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1A:
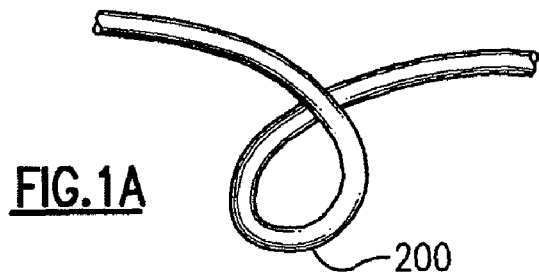
FIG. 1a-c are perspective views of uncovered/unprotected wire in unwanted kinking, bending, coiling, and/or tangling configurations, each of which could cause a short and permanent defect in the wire.

Reference will now be made in detail to the present preferred embodiments of the invention, wherein like reference numerals refer to like components, examples of which are illustrated in the accompanying drawings.

Figure 1B:
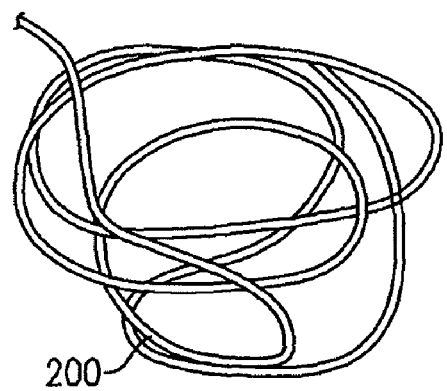
Figure 1C:
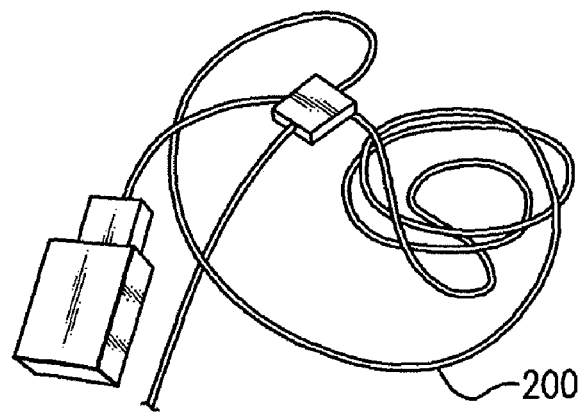

Turning to FIGS. 1a-1c, uncovered/unprotected wire 200 is shown. These figures show examples of unwanted kinking, bending, coiling, and/or tangling, each of which could cause a short and permanent defect in the wire 200.

Figure 2:
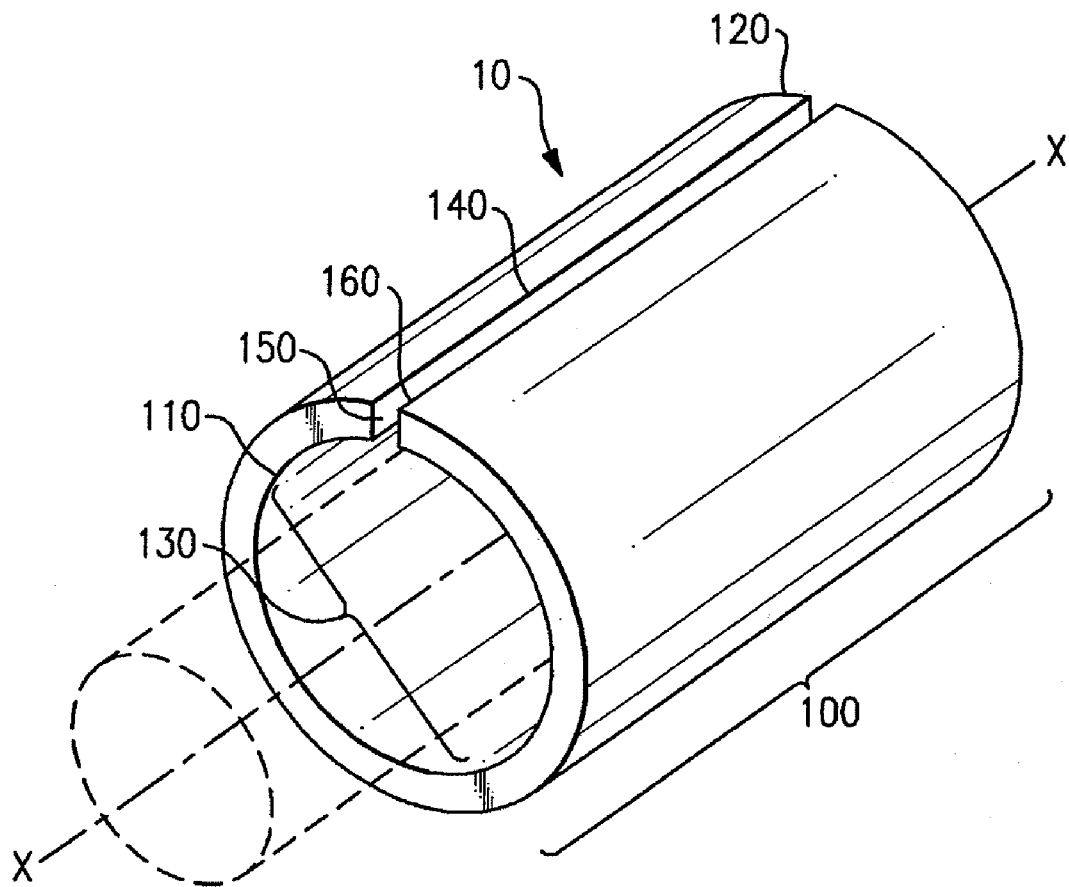
FIG. 2 is a perspective view of a portion of a non-corrugated protective tubular housing for wires according to an embodiment of the present invention.

Turning to FIG. 2, a perspective view of a portion of a non-corrugated protective tubular housing for wires 10 according to an embodiment of the present invention is shown. The non-corrugated protective tubular housing for wires 10 comprises a tubular body 100, with a first open end 110 and a second open end 120 (not fully shown), a hollow volume 130, and a slit 140 which extends along the longitudinal axis X-X and over the length of the tubular body 100 between the first open end 110 and second open end 120.

Figure 3:
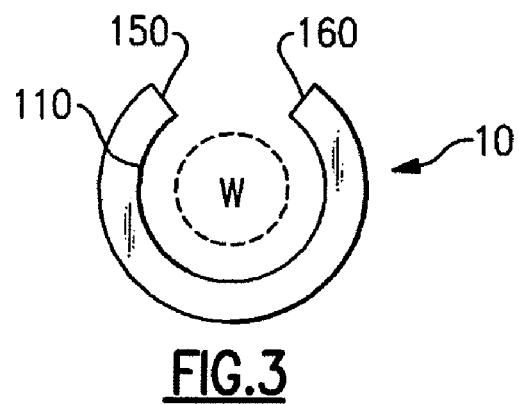
FIG. 3 is a plan view of the first open end of the non-corrugated protective tubular housing for wires of FIG. 2, according to an embodiment of the present invention

Turning to FIG. 3, a plan view of the first open end 110 of the non-corrugated protective tubular housing for wires 10 of FIG. 2, according to an embodiment of the present invention is shown surrounding a wire "W." The tubular body 100 comprises opposing edges, comprising a first opposing edge 150 and a second opposing edge 160, that are biased towards a contacting position (i.e., the opposing edges 150 and 160 are biased towards one another as shown in FIG. 2; FIG. 3, however, shows the opposing edges 150 and 160 being pulled apart for clarity). The opposing edges 150 and 160 may not actually contact one another when they are completely biased towards the contacting position.

Figure 4:
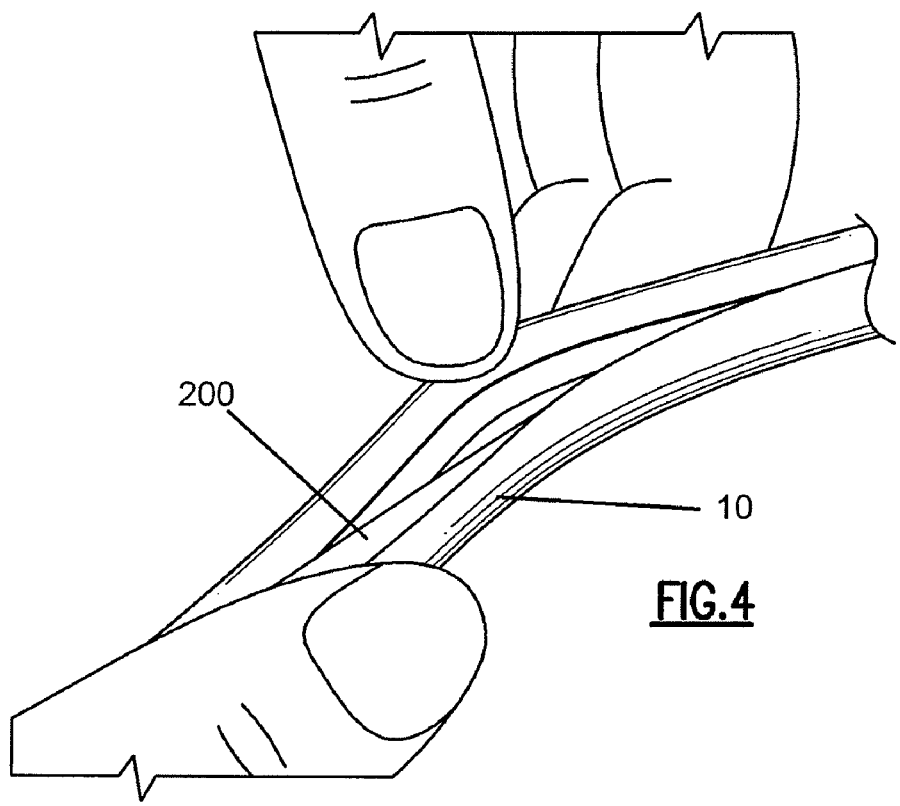
FIG. 4 is a perspective view of a non-corrugated protective tubular housing for wires being placed over and around a wire, according to an embodiment of the present invention.

Turning to FIG. 4, a perspective view of a non-corrugated protective tubular housing for wires 10 being placed over and around a wire 200, according to an embodiment of the present invention is shown. In a preferred embodiment, in order to quickly and easily place the non-corrugated protective tubular housing for wires 10 over and around a wire 200, a user starts at one end of the wire 200 and pries open the end of the non-corrugated protective tubular housing for wires 10 (e.g., a first open end 110), and starts to fit a portion of the wire 200 inside the hollow volume 130 of the tubular body 100. This process is continued until the entire tubular body 100 surrounds at least a portion of the wire 200 (see FIG. 5).

Figure 5:
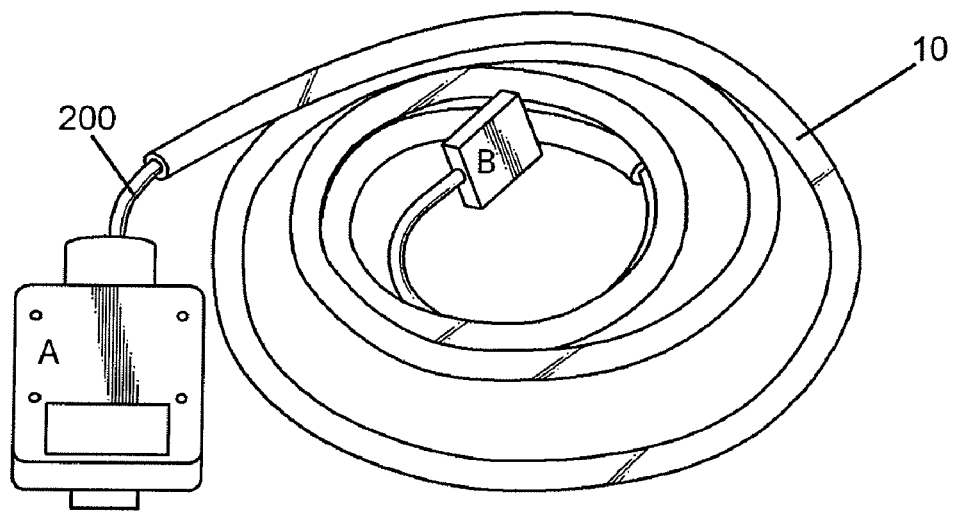
FIG. 5 is a perspective view of a non-corrugated protective tubular housing for wires surrounding at least a portion of a wire with optional components, according to an embodiment of the present invention.

Turning to FIG. 5, a perspective view of a non-corrugated protective tubular housing for wires 10 is shown surrounding at least a portion of a wire 200 according to an embodiment of the present invention. As shown, the non-corrugated protective tubular housing for wires 10 (slit 140 and opposing edges 150/160 are not shown), after its positioning around the wire 200 as discussed supra, keeps the wire 200 in a configuration that substantially prevents any bending, crimping, coiling and/or kinking or other damaging forces from shortening the lifespan of the wire 200 (and from shortening the lifespan of at least one of an optionally attached component such as components A and/or B (components A and B could be digital radiography sensor components or other devices such as curling irons, headphones, audio/video devices, and heating devices for ski boots)). A stopper member such as a wire or plastic tie 170 (not shown), may be used to prevent the non-corrugated protective tubular housing for wires 10 from sliding back and/or forth on the wire 200.

Figure 6:
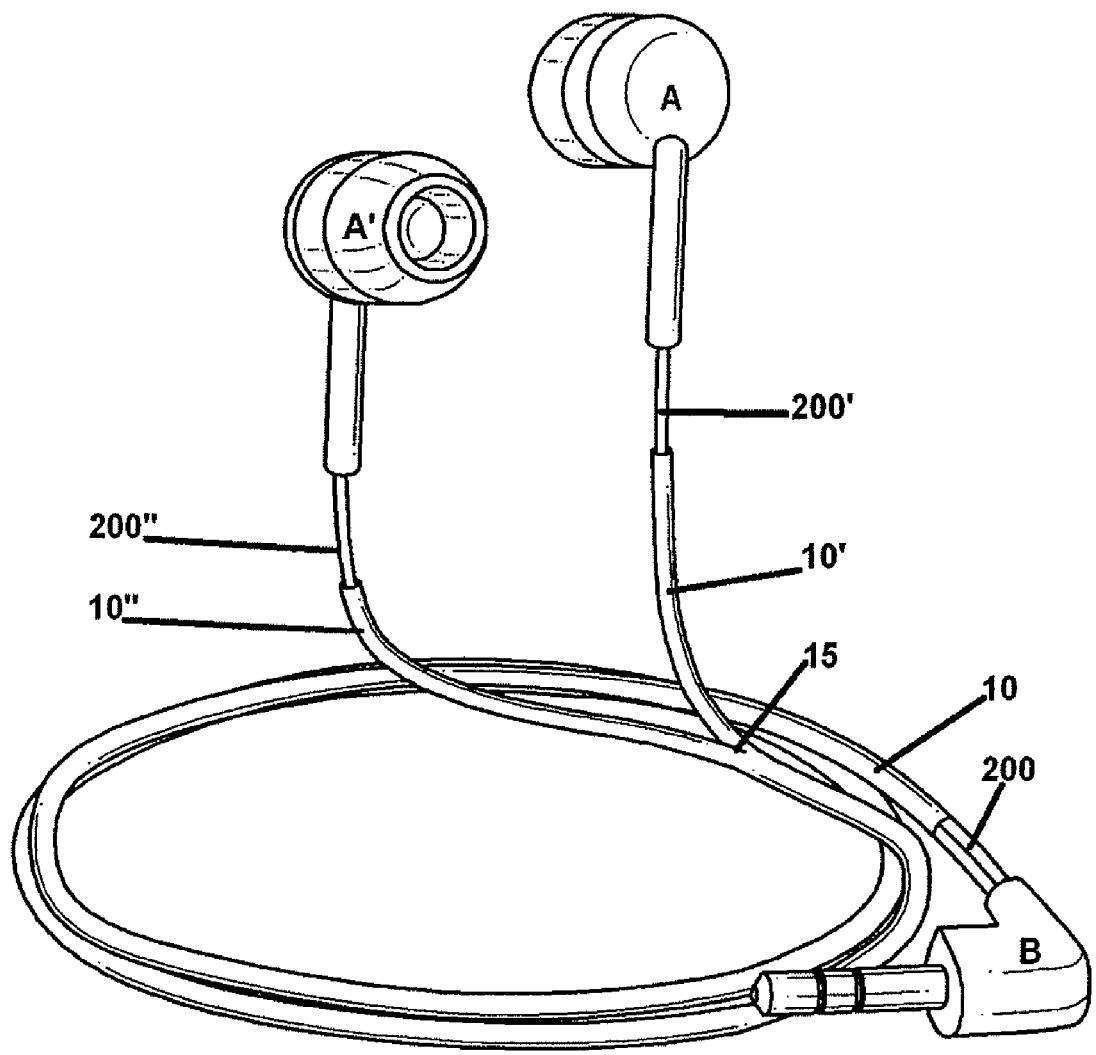
FIG. 6 is a perspective view of a non-corrugated protective tubular housing for wires surrounding at least a portion of a wire with optional components, and with a junction point where the non-corrugated protective tubular housing for wires splits into at least two separate but connected extensions, according to an embodiment of the present invention.

Turning to FIG. 6, a perspective view of a non-corrugated protective tubular housing for wires 10 is shown surrounding at least a portion of a wire 200 according to an embodiment of the present invention. As shown, the non-corrugated protective tubular housing for wires 10 (slit 140 and opposing edges 150/160 are not shown), after its positioning around the wire 200 as discussed supra, keeps the wire 200 in a configuration that substantially prevents any bending, crimping, coiling and/or kinking or other damaging forces from shortening the lifespan of the wire 200. Additionally, this embodiment of the non-corrugated protective tubular housing for wires 10 comprises a junction 15 where the non-corrugated protective tubular housing for wires 10 splits into at least two separate but connected extensions 10' and 10" which surround at least two separate but connected wire portions 200' and 200", respectively. Optional components A and A" are shown, which can be earphones of any type connected to a plug component B.

Figure 7:
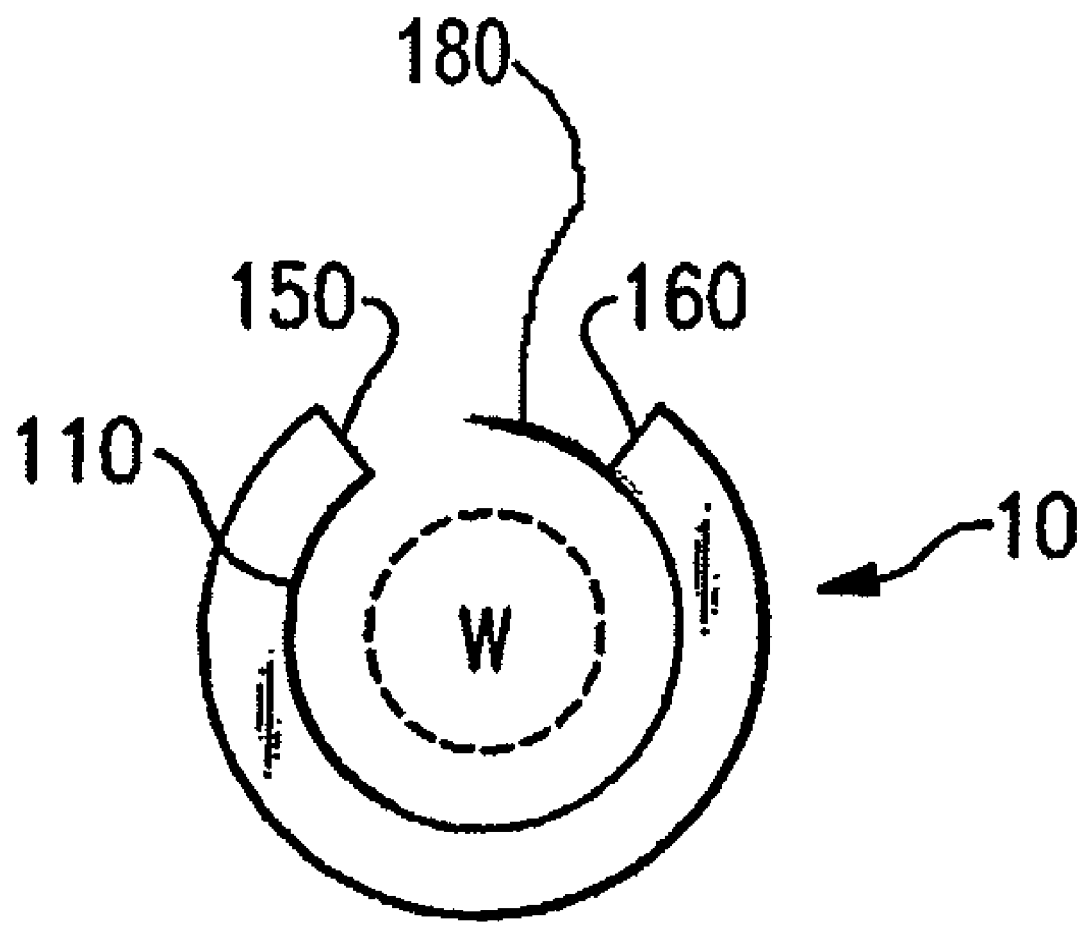
FIG. 7 is a plan view of the first open end of the non-corrugated protective tubular housing for wires, according to an embodiment of the present invention.

Turning to FIG. 7, a plan view of the first open end 110 of the non-corrugated protective tubular housing for wires 10 according to an embodiment of the present invention is shown. FIG. 7 is similar to FIG. 3, except that the tubular body 100 comprises at least one overlapping edge segment 180 extending over at least a portion of the length of the tubular body 100 between the first end 110 and the second end 120 (not shown). The at least one overlapping edge segment is provided to assist in preventing the housed wire "W" from coming out of the non-corrugated protective tubular housing for wires 10 of an embodiment of the present invention. The at least one overlapping edge segment 180 transversely extends from under the second opposing edge 160, under the slit 140, and under the first opposing edge 150 on the inside of the tubular body 100, thereby containing the wire "W" therein. The at least one overlapping edge segment 180 may contain an adhesive 190 (not shown) on its surface to removably seal the at least one overlapping edge segment 180 to the tubular body 100.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives failing within the spirit and scope of the appended claims.

What is claimed is:

1. A conduit for an electrically conducting, elongated member comprising:
   (a) a non-corrugated housing comprising a substantially smooth outside surface extending along a longitudinal axis that defines a length between a first end and a second end and defining a hollow volume, wherein at least one of said first end and said second end is an open end, and at least one overlapping edge segment extending over at least a portion of the length of the non-corrugated housing between said first end and said second end; and
   (b) a slit extending along the longitudinal axis and over at least a portion of the length between said first end and said second end.

2. The conduit for an electrically conducting elongated member of claim 1, wherein said slit is defined by opposing first and second edges that are biased towards a contacting position.

3. The conduit for electrically conducting elongated members of claim 1, wherein each of said first end and said second end is an open end.

4. The conduit for electrically conducting elongated members of claim 1, wherein said electrically conducting elongated member comprises a wire selected from the group consisting of electrical wire, optical wire, video wire, cable wire, telephonic wire, fiber optic wire, data wire, power wire, digital wire, and USB wire.

5. The conduit for electrically conducting elongated members of claim 1, wherein said non-corrugated protective tubular housing for electrically conducting elongated members is made from a flexible resilient material.

6. The conduit for electrically conducting elongated members of claim 5, wherein said flexible resilient material is medical grade silicon.

7. The conduit for electrically conducting elongated members of claim 1, wherein said non-corrugated protective tubular housing for electrically conducting elongated members has a length that is shorter than a length of said electrically conducting elongated member.

8. The conduit for electrically conducting elongated members of claim 1, wherein said non-corrugated protective tubular housing for electrically conducting elongated members has a length that is substantially the same as a length of said electrically conducting elongated member.

9. The conduit for electrically conducting elongated members of claim 1, wherein said non-corrugated protective tubular housing for electrically conducting elongated members has a length that is longer than a length of said electrically conducting elongated member.

10. The conduit for electrically conducting elongated members of claim 1, wherein said non-corrugated protective tubular housing for electrically conducting elongated members has a non-uniform inner diameter.

11. The conduit for electrically conducting elongated members of claim 1, wherein said non-corrugated protective tubular housing for electrically conducting elongated members has a substantially uniform inner diameter.

12. The conduit for electrically conducting elongated members of claim 11, wherein the substantially uniform inner diameter is larger than an outer diameter of the electrically conducting elongated member.

13. The conduit for electrically conducting elongated members of claim 11, wherein the substantially uniform inner diameter is substantially the same as an outer diameter of the electrically conducting elongated member.

14. The conduit for electrically conducting elongated members of claim 1, wherein said electrically conducting elongated member further comprises at least one attached component.

15. The conduit for electrically conducting elongated members of claim 14, wherein the at least one attached component comprises a digital radiography sensor.

16. The conduit for electrically conducting elongated members of claim 14, wherein the at least one attached component comprises a component selected from the group consisting of a speaker, telephonic headset, iron, computer mouse, earphone set, computer, and television.

17. The conduit for electrically conducting elongated members of claim 14, further comprising at least one stopper member placed around a portion of said in between said non-corrugated protective tubular housing for electrically conducting elongated members and said component.

18. A method for substantially preventing damaging forces from shortening the effective lifespan of an electrically conducting elongated member comprising the step of housing the electrically conducting elongated member within a conduit for electrically conducting elongated members wherein said non-corrugated protective tubular housing for electrically conducting elongated members comprises:

(a) a non-corrugated housing comprising a substantially smooth outside surface extending along a longitudinal axis that defines a length between a first end and a second end and defining a hollow volume, wherein at least one of said first end and said second end is an open end, and at least one overlapping edge segment extending over at least a portion of the length of the non-corrugated housing between said first end and said second end; and (b) a slit extending along the longitudinal axis and over at least a portion of the length between said first end and said second end.

19. The method of claim 18, wherein each of said first end and said second end is an open end.

20. The method of claim 18, wherein said slit is defined by opposing first and second edges that are biased towards a contacting position.

21. The method of claim 20, wherein the step of housing further comprises the steps of:

(a) separating said first edge from said second edge; and (b) surrounding a portion of said electrically conducting elongated member with said non-corrugated protective tubular housing for electrically conducting elongated members.

22. The method of claim 18, wherein said electrically conducting elongated member comprises a wire selected from the group consisting of electrical wire, optical wire, video wire, cable wire, telephonic wire, fiber optic wire, data wire, power wire, digital wire, and USB wire.

23. A conduit for a non-electrically conducting elongated member comprising:

(a) a non-corrugated housing comprising a substantially smooth outside surface extending along a longitudinal axis that defines a length between a first end and a second end and defining a hollow volume, wherein at least one of said first end and said second end is an open end, and at least one overlapping edge segment extending over at least a portion of the length of the non-corrugated housing between said first end and said second end; and (b) a slit extending along the longitudinal axis and over at least a portion of the length between said first end and said second end.

24. A conduit for an electrically conducting elongated member or a non-electrically elongated conducting member, comprising:

(a) a substantially smooth non-corrugated housing comprising a substantially smooth outside surface extending along a longitudinal axis that defines a length between a first end and a second end and defining a hollow volume, wherein at least one of said first end and said second end is an open end, and at least one overlapping edge segment extending over at least a portion of the length of the non-corrugated housing between said first end and said second end; and (b) a slit extending along the longitudinal axis and over at least a portion of the length between said first end and said second end.

* * * * *